(12) United States Patent
Salmikuukka et al.

(10) Patent No.: US 10,427,910 B2
(45) Date of Patent: Oct. 1, 2019

(54) DISPLAY LANGUAGE ARRANGEMENT

(71) Applicants: Jukka Salmikuukka, Espoo (FI); Jere Vuorenala, Hyvinkaa (FI); Kim Bergman, Helsinki (FI); Mika Belov, Tuusula (FI); Hannu Nousu, Helsinki (FI)

(72) Inventors: Jukka Salmikuukka, Espoo (FI); Jere Vuorenala, Hyvinkaa (FI); Kim Bergman, Helsinki (FI); Mika Belov, Tuusula (FI); Hannu Nousu, Helsinki (FI)

(73) Assignee: Kone Corporation, Helsinki (FI)

( * ) Notice: Subject to any disclaimer, the term of this patent is extended or adjusted under 35 U.S.C. 154(b) by 289 days.

(21) Appl. No.: 15/444,845

(22) Filed: Feb. 28, 2017

(65) Prior Publication Data
US 2017/0166417 A1   Jun. 15, 2017

Related U.S. Application Data

(63) Continuation of application No. PCT/FI2014/050719, filed on Sep. 19, 2014.

(51) Int. Cl.
G06F 3/147 (2006.01)
B66B 3/00 (2006.01)
B66B 1/46 (2006.01)
H04W 4/80 (2018.01)
G06F 17/28 (2006.01)
G09F 23/00 (2006.01)
G09G 5/12 (2006.01)

(52) U.S. Cl.
CPC .............. B66B 3/008 (2013.01); B66B 1/468 (2013.01); B66B 3/00 (2013.01); G06F 3/147 (2013.01);
(Continued)

(58) Field of Classification Search
CPC .......... B66B 1/468; B66B 3/00; B66B 3/008; G06F 17/289; G06F 3/147; G09F 23/00;
(Continued)

(56) References Cited

U.S. PATENT DOCUMENTS 6,535,132 B2   3/2003   Waters et al.
7,024,180 B2   4/2006   Waters et al.
(Continued)

FOREIGN PATENT DOCUMENTS

EP   1158821 A1   11/2001
EP   1870367 A1   12/2007
EP   2692677 A1   2/2014

OTHER PUBLICATIONS

International Search Report PCT/ISA/210 for International Application No. PCT/FI2014/050719 dated Mar. 6, 2015.
(Continued)

*Primary Examiner* — Afroza Chowdhury
(74) *Attorney, Agent, or Firm* — Harness, Dickey & Pierce, P.L.C.

(57) ABSTRACT

Public displays are used for various purposes. They are used for displaying any kind of information and even for controlling devices such as elevators. In order to provide best possible benefit the public display should be displaying information in a language that the viewer understands and in a manner that the user can read the text on the display. The user preferences may be selected and applied by requesting a user preference indication from a mobile device. If the room includes more than one person the user preference indication is received from a plurality of persons and the decision of user preferences to be used is done then based on the received indications.

20 Claims, 2 Drawing Sheets

(52) U.S. Cl.
CPC ............ *G06F 17/289* (2013.01); *G09F 23/00* (2013.01); *G09G 5/12* (2013.01); *H04W 4/80* (2018.02); *G09G 2320/08* (2013.01); *G09G 2354/00* (2013.01); *G09G 2370/16* (2013.01)

(58) Field of Classification Search
CPC ........... G09G 2320/08; G09G 2354/00; G09G 2370/16; G09G 5/12; H04W 4/80
See application file for complete search history.

(56) References Cited

U.S. PATENT DOCUMENTS

| | | | |
|---|---|---|---|
| 7,881,662 | B2 | 2/2011 | Banatre et al. |
| 8,910,309 | B2 | 12/2014 | Harrison et al. |
| 2002/0008626 | A1 | 1/2002 | Waters et al. |
| 2002/0013144 | A1 | 1/2002 | Waters et al. |
| 2009/0047899 | A1 | 2/2009 | Banatre et al. |
| 2013/0143651 | A1 | 6/2013 | Harrison et al. |
| 2013/0179263 | A1* | 7/2013 | Leebow ................ H04W 4/023 705/14.58 |
| 2014/0054116 | A1 | 2/2014 | Wu |

OTHER PUBLICATIONS

Written Opinion of the International Searching Authority PCT/ISA/237 for International Application No. PCT/FI2014/050719 dated Mar. 6, 2015.

* cited by examiner

DISPLAY LANGUAGE ARRANGEMENT

This application is a continuation of PCT International Application No. PCT/FI2014/050719 which has an International filing date of Sep. 19, 2014, the entire contents of which are incorporated herein by reference.

FIELD OF THE INVENTION

The invention relates to public displays and in particularly to choosing the language of operation for such display.

BACKGROUND OF THE INVENTION

Public displays are commonly available in various applications. For example, a public display can be located in an elevator. The display can be used for various purposes including displaying important information, commercial messages and other messages. Sometimes the public display is used even for elevator controls. The display may be a touch sensitive display or there may be further control keys in the vicinity of the display, such as conventional buttons. In some applications public display system includes a plurality of displays configured to show different information on each of the screens in a manner that the user experience is maximized. An important issue in maximizing the user experience is the language of the display. When messages are shown to a person in a preferred language the user experience is maximized.

The most conventional solution is to include all information in a plurality of languages, however, in more advanced solutions including displays may include a plurality of language versions and only the chosen is shown. In prior art solutions the language can be chosen manually, for example, by tapping an icon showing a flag on the touch screen or by introducing a key card, or other electronic key acting as a key card, for example a mobile device using near field communication, at the elevator panel. In this case the language selection has been previously stored to the key card.

The problem with the prior art is that the language selection is done only after touching the display or introducing the key card or similar. Furthermore, as the key cards are typically site specific in many cases the key card does not work when the person wishing to change the language is not in an elevator connected to the system controlling his key card or other access control device.

SUMMARY

Public displays are used for various purposes. They are used for displaying any kind of information and even for controlling devices such as elevators. In order to provide best possible benefit the public display should be displaying information in a language that the viewer understands. Furthermore, the properties of the display should be adjusted so that a person can read the text on the display without burden. For example, the font should be large enough and the contrast and color selection should be adjusted such that the text is easy to read. In an embodiment of the invention user preferences may be selected by requesting a user preference indication from a mobile device. If the room or space includes more than one person the user preference indication is received from a plurality of persons and the decision of preferences to be used is done then based on the received indications, however, possible legal limitations are taken into account. For example, the law may require that the control panel of an elevator is available also in an official language of the state.

In a further embodiment of the invention is implemented as a method for choosing a language for a public display arrangement. In the method at least one mobile device in the vicinity of the display is detected. The communication between the public display and the detected mobile devices is established. The communication is established by using a connection covering at least the area from where the content of said public display can be seen. For example, if the public display has been installed to an elevator the communication technology should be able to cover the whole elevator so that the passengers need not to interact in the process but it is performed automatically, for example, when the mobile device is in a pocket or bag. Using the communication at least one indication of at least one preferred language from at the at least one mobile device is received. At least one language of operation for the at least one public display based on the received at least one indication is determined. In the end the determined at least one language to the at least one public display respectively is applied.

The above mentioned at least one indication of at least one user preference may indicate more than one user preference in order of preference. The indication may be received from an application executed in a mobile device or it may be retrieved from a public profile such as Bluetooth profile of the device. In an embodiment of the invention the method disclosed above is implemented as a computer program that is executed in a computing device.

The computing device may be an apparatus comprising processor, at least one memory and a wireless network connection. The apparatus is configured to detect at least one mobile device in the vicinity of said display, establish communication between said public display and said detected mobile devices, receive at least one indication of at least one user preference from at said at least one mobile device, determine at least one user preference for said at least one public display based on said received at least one indication, and apply said determined at least one user preference to said at least one public display respectively.

The apparatus may be further configured to receive said at least one indication of at least one user preference indicating more than user preference in order of preference. The apparatus may be configured to receive the indication from a mobile device using a controlling application or by retrieving a public profile of a mobile device, such as Bluetooth public profile. In a further embodiment the apparatus described above is incorporated to an elevator car.

A local communication method is used for communication between a public display and mobile device. Any suitable communication method may be used, however, the method must be such that the public display arrangement is able to communicate with the mobile device without any actions performed by the user of the device. Thus, the mobile device must be able to communicate with the public display, for example, when it is in a bag or pocket. For example, in an application involving a public display in an elevator this means the communication distance is few meters and in a larger space application, such as a lobby, the distance may be chosen according to the application need, however, typically not longer than average eye-sight but long enough that people passing by do not need to go closer in order to apply their user preferences.

The benefits of the invention include an advanced selection of user preferences for public displays. The advanced selection provides the best possible understandability for viewers by choosing user preferences, such as language, font size, color, contrast and similar according to the received preferred user preference indications. Thus, the system is capable of providing the information shown on the public display in a language that the majority of viewers understand in a manner that they can read. Furthermore, the user preferences are not limited only to the manner how the information is displayed but also which content is displayed. Furthermore, the benefits of the invention include the automatic indication of user preferences. Thus, the person viewing the public display does not need to be active in applying user preferences but user preferences are chosen automatically. Furthermore, the automatic user preference appliance works even in those cases where the person viewing the display is not even aware of possibility of applying user preferences. A further benefit of the invention is that the selection may be performed even if the person is located too far from the conventional selector that needs to be touched. For example, in a modern large elevator the distance may be few meters.

In addition to the improved user experience the benefits of the invention include that the user does not need any separate key card and there is no need to store user preferences to a database associated with said key card.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
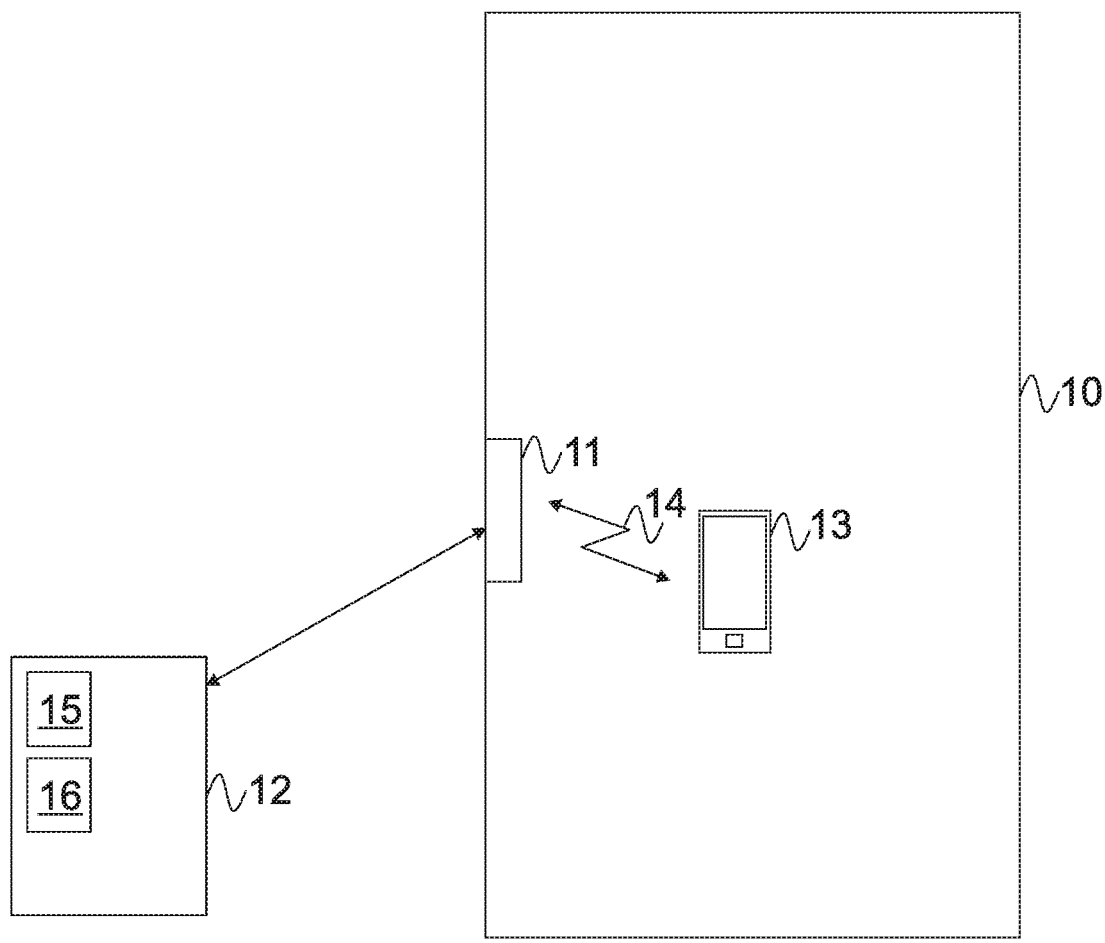
FIG. 1 is a block diagram of an example embodiment of the present invention.

In FIG. 1 a block diagram of an embodiment of the present invention. In the embodiment a language selection is used as an example, however, other user preferences are applied correspondingly. Furthermore, it is possible to receive indication or indications for a plurality of user preferences that may be applied if it is possible. In the embodiment a public display 11 is located in an elevator car 10. The public display 11 may be related to controlling of the movements of the elevator car 10 or it may be a separate system displaying important information, entertainment, advertisements or any kind of information what could be of interest. Passengers travelling using the elevator car 10 have a mobile device 13 which is communicating with the public display by using a wireless communication method 14. The wireless communication method is typically Bluetooth, WiFi or similar local communication method, which can communicate over a small distance without a need of close contact comparable to an introduction of key card. The network connectivity means may be incorporated with the public display or there may be a separate transceiver coupled to the controller controlling the display. The public display may include controller for controlling the device or the controller may be an external server 12. In case of an external server 12 the server 12 comprises a processor 15 and at least one memory 16 needed for processing requests, executing computer programs and for storing different language versions. The at least one memory 16 may be a combination of volatile and non-volatile memories of different technologies. Thus, the public display 11 receives instructions from the server 12 located somewhere else. When the person enters the elevator car 10 the public display 11 detects a new mobile device 13. A communication is established between the public display 11 and mobile device 13.

After establishing the communication between the public display 13 and the mobile device 11 the mobile device 13 submits an indication of at least one preferred language to the public display. The communication may be initiated by public display 11 or mobile device 13. For example, the mobile device may include an application that is used for controlling services relating public displays. Then, the mobile device 13 may send the indication of at least one preferred language, however, the owner of the mobile device 13 may prevent the transmittal if he wishes so. Correspondingly, if the public display 11 requests the indication from the application the owner may prevent it. In other implementation the network connection involves public profile information, such as Bluetooth profile. The profile may include a language indication, which is then automatically read by the public display 13.

With the received at least one indication the public display may adapt languages in a manner that preferences of as large portion people as possible are taken into account. Thus, the public display will be able to show all information so that majority of people seeing the display will understand the message.

Figure 2:
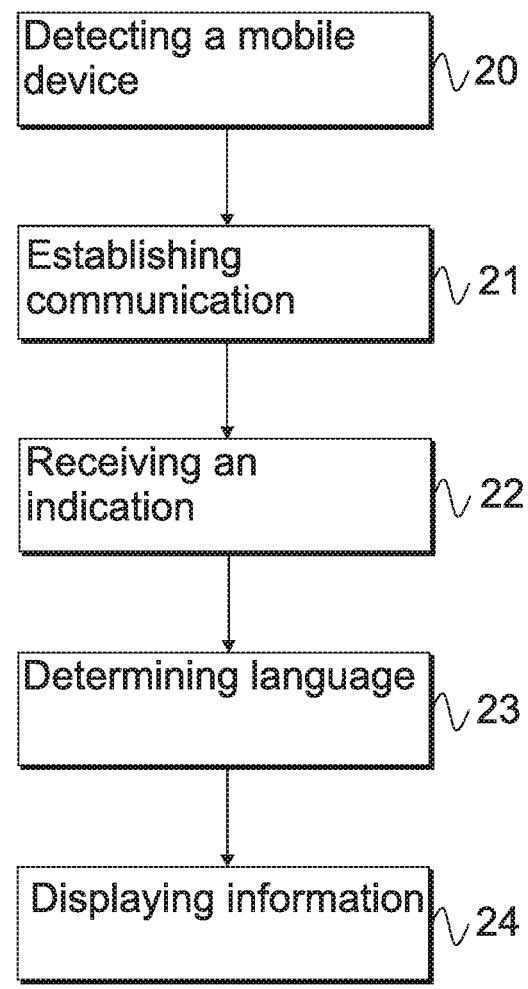
FIG. 2 is a flow chart of a method according to the present invention.

In FIG. 2 a flow chart of a method according to the present invention is disclosed. In the method the language selection of a public display, such as a display located in an elevator, is controlled by mobile device, such as a mobile phone. The method is initiated by detecting a mobile phone in the vicinity of a public display, step 20. This can be achieved, for example, by detecting a device transmitting Bluetooth, Wi-Fi, or similar signal that can be received at the public display or the receiver connected to the controller of the public display. Then the communication between the mobile device and the public screen is initiated, step 21. This can be done by various ways. For example, in an embodiment of the invention the connectivity type used for communication comprises a profile including a language that can be requested. In another embodiment the mobile device comprises an application for controlling a plurality of features related to the public display or for example, to the elevator. In case of the application the public display will request the application to provide the language information.

As a response to the request an indication of the preferred language is received at the public display, step 22. The received indication may include more than one language, for example, if the person is of the opinion that Finnish language is preferred, however, if it is not possible to use Finnish English language is also acceptable. The number of preferred languages is not limited to two.

The public display may receive more than one indication. Thus, when determining the language to be used in step 23, the public display must solve from the received indications what is the best language to be used or if it is possible to use two or more languages which is the best combination according to the received indications.

Determined languages are then used when displaying information to the audience, step 24. The information may be any kind of information that is available on the specific language. For example in case of an elevator, the content of the information may relate to the user interface of the elevator and after passengers have chosen their floors the public display may be used for displaying informative messages, entertainment, advertisements and similar.

In a further embodiment of the invention the system determines that the display of the mobile device the person is using is capable of acting as a replacement to the public display. Thus, the language chosen is not presented on the public screen but the information is sent to screen of the mobile device in the selected language. The recognition may be included in the step of where the language indications are received. Thus, for example, if one person has chosen a language that nobody else has chosen the information may be shown on the display of the mobile device of that person and when selecting the language for a public display that language indication of a single person does not need to be taken into account.

The above mentioned method may be implemented as computer software which is executed in a computing device able to communicate with a mobile device. When the software is executed in a computing device it is configured to perform the above described inventive method. The software is embodied on a computer readable medium so that it can be provided to the computing device, such as the server 12 of FIG. 1.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD±R, CD±RW, DVD, DVD-RAM, DVD±RW, DVD±R, HD DVD, HD DVD-R, HD DVD-RW, HD DVD-RAM, Blu-ray Disc, any other suitable optical medium, a RAM, a PROM, an EPROM, a FLASH-EPROM, any other suitable memory chip or cartridge, a carrier wave or any other suitable medium from which a computer can read.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for applying user preferences for at least one public display comprising:
   detecting at least one mobile device in a vicinity of said at least one public display;
   establishing communication between said at least one public display and said at least one mobile device, said communication being established using one or more signals having a communication range covering at least an area in which content output by said at least one public display is visible;
   receiving at least one indication of at least one user preference from each of said at least one mobile device by
      receiving an identification from said at least one mobile device,
      transmitting a request to a server storing one or more user preferences in association with said identification, and
      receiving said at least one indication of said at least one user preference as a response to said request;
   determining at least one user preference for said at least one public display based on said at least one indication; and
   applying said determined at least one user preference to said at least one public display, said at least one user preference including a preferred language of operation, and said at least one indication received from each of said at least one mobile device indicating more than one language of operation in order of preference.

2. A non-transitory computer readable medium storing a computer program for a server comprising code configured to perform the method according to claim 1 when executed on a data-processing system.

3. The method according to claim 1, wherein said identification corresponds to a Bluetooth profile.

4. The method according to claim 1, further comprising:
   determining whether communication of at least one user preference by said at least one mobile device is disabled,
   wherein said receiving said at least one indication of said at least one user preference of said at least one mobile device is performed in response to determining communication of said at least one user preference by said at least one mobile device is not disabled.

5. The method according to claim 1, wherein said at least one user preference includes said preferred language of operation, a font size of said content, a color of said content and a contrast setting of said content.

6. The method according to claim 1, wherein said content is related to controlling movement of an elevator.

7. The method according to claim 1, wherein said determining said at least one user preference includes determining a combination of preferred languages of operation.

8. The method according to claim 7, wherein said applying said determined at least one user preference includes outputting said content on said at least one public display in said combination of preferred languages of operation.

9. An apparatus comprising:
   at least one public display;
   at least one memory storing computer-readable instructions; and
   at least one processor configured to execute said computer-readable instructions to
      detect at least one mobile device in a vicinity of said at least one public display,
      establish communication between said at least one public display and said at least one mobile device, said communication being established using one or more signals having a communication range covering at least an area in which content output by said at least one public display is visible,
      receive at least one indication of at least one user preference from each of said at least one mobile device by
         receiving an identification from said at least one mobile device,
         transmitting a request to a server storing one or more user preferences in association with said identification, and
         receiving said at least one indication of said at least one user preference as a response to said request
      determine at least one user preference of operation for said at least one public display based on said at least one indication, and apply said determined at least one user preference to said at least one public display, said at least one user preference including a preferred language of operation, and said at least one indication received from each of said at least one mobile device indicating more than one language of operation in order of preference.

10. An apparatus according to claim 9, wherein said communication is established using one or more Bluetooth signals or over a wireless local area network.

11. An elevator comprising the apparatus according to claim 9.

12. An apparatus comprising:
   at least one public display;
   at least one memory storing computer-readable instructions; and
   at least one processor configured to execute said computer-readable instructions to
      detect at least one mobile device in a vicinity of said at least one public display,
      establish communication between said at least one public display and said at least one mobile device, said communication being established using one or more signals having a communication range covering at least an area in which content output by said at least one public display is visible,
      determine whether communication of at least one user preference by said at least one mobile device is disabled,
      receive at least one indication of said at least one user preference of said at least one mobile device in response to determining communication of said at least one user preference by said at least one mobile device is not disabled,
      determine at least one user preference of operation for said at least one public display based on said at least one indication, and
      apply said determined at least one user preference to said at least one public display.

13. The apparatus according to claim 12, wherein said at least one user preference is a preferred language of operation.

14. The apparatus according to claim 13, wherein said at least one indication indicates more than one language of operation in order of preference.

15. The apparatus according to claim 12, wherein said at least one processor is configured to execute said computer-readable instructions to receive said at least one indication of said at least one user preference from a controlling application of said at least one mobile device.

16. The apparatus according to claim 12, wherein said at least one processor is configured to execute said computer-readable instructions to receive said at least one indication of said at least one user preference by retrieving a public profile of said at least one mobile device.

17. The apparatus according to claim 16, further comprising:
   a Bluetooth transceiver,
   wherein said at least one processor is configured to execute said computer-readable instructions to retrieve said public profile using said Bluetooth transceiver.

18. The apparatus according to claim 13, wherein said at least one processor is configured to execute said computer-readable instructions receive said at least one indication of said at least one user preference by
   receiving an identification from said at least one mobile device,
   transmitting a request to a server storing one or more user preferences in association with said identification, and
   receiving said at least one indication of said at least one user preference as a response to said request.

19. An apparatus according to claim 12, wherein said communication is established using one or more Bluetooth signals or over a wireless local area network.

20. An elevator comprising the apparatus according to claim 12.

* * * * *